Feb. 28, 1928.
O. SEVERSON
1,660,361
BORING HEAD
Filed Dec. 20, 1924
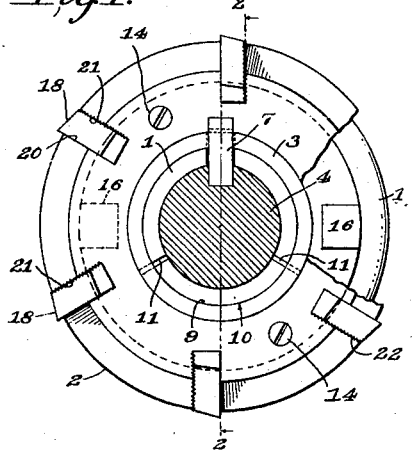
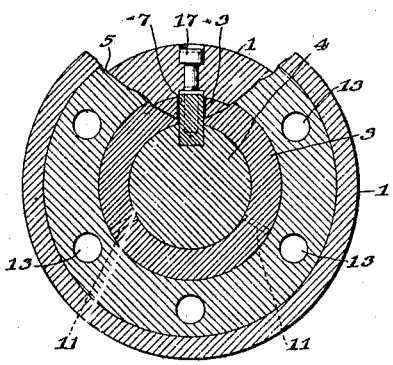
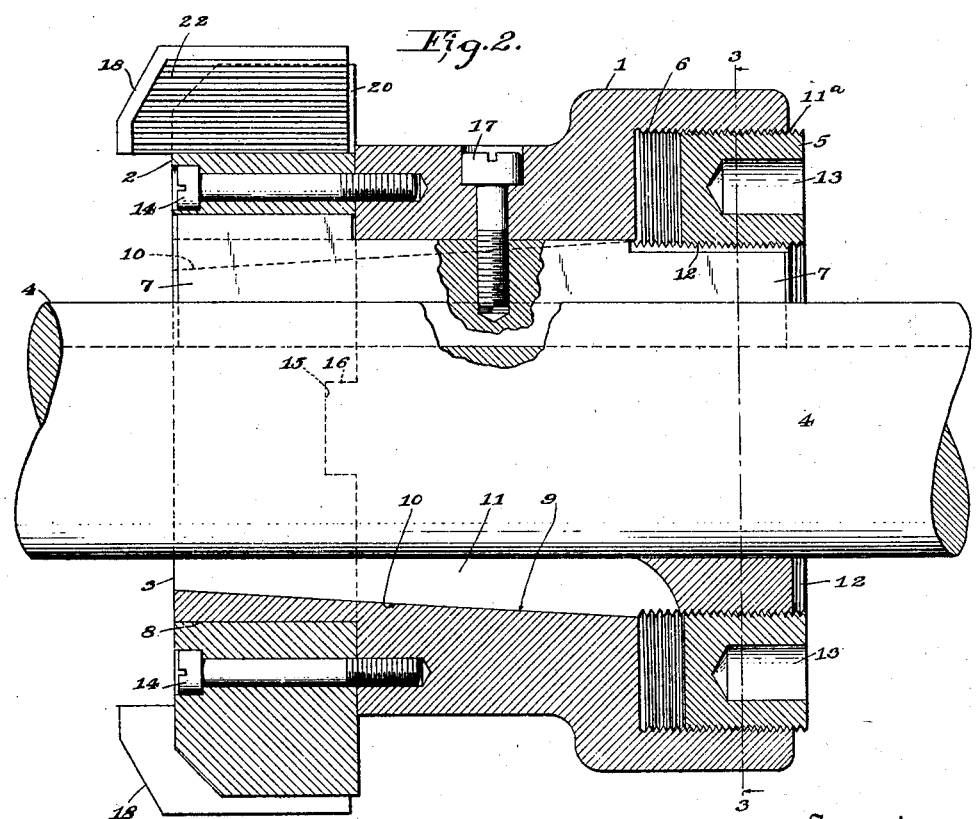
Inventor
Ole Severson
By Attorney
Albert F. Nathan Patented Feb. 28, 1928.

1,660,361

UNITED STATES PATENT OFFICE.

OLE SEVERSON, OF SHELTON, CONNECTICUT, ASSIGNOR TO THE O. K. TOOL COMPANY, INC., OF NEW YORK, N. Y., A CORPORATION OF NEW YORK.

BORING HEAD.

Application filed December 20, 1924. Serial No. 757,199.

My invention relates to cutting tools adapted to be clamped in various positions along a supporting shaft and particularly to boring heads of the detachable blade type.

One object of my invention is to provide an efficient and quick means for clamping a cutting tool in various positions on a supporting shaft without sacrificing in any manner the rigidity and strength of the tool.

Another object of my invention is to provide a boring head of the above indicated type that shall have detachable blades so secured in position as to permit of their radial adjustment with respect to the axis of the boring head and that shall be provided with simple means for replacing one set of cutting blades by a second set of blades of the same size or of a different size.

In operating a milling or a boring machine having a horizontal shaft for supporting the cutting tool, it is very desirable at times to shift the tool along the supporting shaft and to clamp it for operation at various points. Moreover, it is very desirable at times to support more than one cutting tool of the same size or different sizes on the same shaft. An example of the utility or necessity for so mounting the tools on a single shaft may be the boring or reaming out the crank-shaft or the cam-shaft bearings in crank cases. In crank cases two or more concentric bearings are spaced apart at different distances. In boring or reaming bearings in a crank-case it may be desirable, according to conditions, to shift a single boring head along the supporting shaft or to mount a number of boring heads on the shaft.

A cutting tool constructed in accordance with my invention may be quickly positioned and clamped at various points along a supporting shaft and, if so desired, a number of such cutting tools may be quickly clamped to the same shaft. When one cutting tool is utilized to bore or ream a number of concentric bearings in a single piece of work, such for example, as in a crank case, it is necessary either to position the tool for each bearing to be operated on or to feed the tool continuously until all bearings of the work-piece have been operated on. The feeding of a single tool continuously through a number of bearings will entail a considerable loss of time. Moreover unless the cutting tool can be quickly unclamped and clamped in a new position, no saving of time will be effected by changing the position of the tool along the shaft. In my improved construction the clamping of the cutting tool is effected in such manner as to permit the changing of the position of the tool without loss of time. Although my invention has been illustrated by means of a boring head, it is to be understood that many other similar cutting tools may be constructed in a like manner.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

In the accompanying drawing, Figure 1 is an end view, partially in section, of a boring head constructed in accordance with my invention. Fig. 2 is an enlarged sectional view of the boring head taken along the line 2—2 of Fig. 1. Fig. 3 is a reduced sectional view along the line 3—3 of Fig. 2.

Referring to the drawing, a boring head is illustrated comprising a body member 1 having a blade-holding member 2 secured thereto. A tapered sleeve 3, which is located within the body member 1, is fitted to a support shaft 4. A clamping ring 5, which is located in a recess 6 formed between the tapered sleeve 3 and the body member 1, serves to effect relative movement between the body member 1 and the sleeve 3 for clamping and unclamping purposes. A suitable key member 7 is connected to the body member 1, the holding member 2 and the shaft 4 for preventing relative rotation between them.

A cylindrical inside surface 8 of the holding-member 2 is fitted to the body member 1. The inside surface 9 of the body member 1 is preferably formed in the shape of a truncated cone. The outside perimeter 10 of the tapered sleeve 3 is also formed in the shape of a similar truncated cone. Suitable slots 11, which are formed in the sleeve 3, serve to permit expansion and contraction of the sleeve for effecting clamping and unclamping between the sleeve and the shaft 4. By reason of the truncated surfaces formed on the body member and on the sleeve it is apparent relative movement between such members along the shaft in one direction serves to effect a clamping operation and relative movement in an opposite direction serves to effect an unclamping operation. The relative movement between the body member 1 and the sleeve 3 is effected by operating a clamping ring 5. The clamping ring 5 is connected to the body member 1 by threads 11$^a$ of one hand and is connected to the sleeve 3 by threads 12 of an opposite hand. By so connecting the clamping ring to the body member and the sleeve, a two-fold or compound movement of such parts is effected upon rotation of the clamping ring in either direction. No matter which direction the clamping ring is rotated the body member and also the sleeve member are moved relatively to it in opposite directions along the shaft 4. The key member 7, as heretofore set forth, serves to prevent any relative rotation between the body member 1, the sleeve 3, and the shaft 4. Suitable holes 13 are formed in the clamping ring 5 for connecting a suitable spanner wrench to it. With the above arrangement a quick release or securing of the cutter may be effected with a relatively small rotation of the ring 5.

The blade-holding member 2, which is secured to the body member 1 by means of bolts 14, is preferably provided with slots 15 formed on one side thereof for receiving projecting parts 16 on the body member 1. The connection thus formed between the holding member and the body member serves to insure against any rotative movement of the holding member with respect to the tool. A set screw 17 is preferably secured in the body member 1 for holding the key member 7 securely in position.

The holding member 2 is shown provided with six cutting blades 18. The cutting blades 18 are fitted in slots 20 which are formed in the holding member 2. Although six cutting blades 18 are shown on the drawing it is to be understood the number of such blades may be varied as desired. One side of each of said slots 20 is provided with ridges or corrugations 21. Such ridges or corrugations 21 are preferably formed parallel to one cutting edge of the blade inserted in the slot and to the axis of the tool. The ridges formed in the six slots shown in the drawing preferably are similar in all respects except that the ridges in the different slots are displaced at slightly different distances away from the axis of the tool. In such a construction it is apparent that a cutting blade 18 having ridges or corrugations 22 formed on one face thereof to fit the ridges in the side of the slots 20 will protrude progressively further away from the axis of the tool when successively inserted in each of the slots.

In order to securely wedge the blades 18 in the slots 20, they are made in the form of wedges and the slots are similarly wedge-shaped. The slots 20 are provided with sufficient clearance whereby the blades may be securely wedged into position. The serrations or ridges, which are formed in the slots and on the cutting blades 18, serve to prevent any radial movement of the blades with respect to the holding member and also provide an efficient means for adjusting the blades radially with respect to the axis of the tool. The end and one side edge of each blade may be ground and sharpened and the tool used until the blades become dull. Thereupon by striking the protruding end edges of the blades they may be driven out and replaced in the next adjacent slot of the series of slots. This will result in shifting each tooth except the last tooth radially away from the axis of the tooth a distance corresponding to the increment between the position of the ridges in the successive slots. The last blade will fall into the position of the first blade and will be shifted a complete corrugation or wedge and in consequence will protrude somewhat more than the other blades because the corrugations are preferably made wider than the sum of all the increments. The extra protrusion of the last tooth will, of course, be ground off and the whole series of blades ground down to the correct diameter and sharpened.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure by the following combinations and elements, or equivalents thereof, by Letters Patent of the United States:

1. A cutting tool combining a shaft; a cutter tool body adapted to be adjustably secured thereon; and means for clamping the cutter in adjusted positions comprising a sleeve adapted to serve as a wedging member between said body and shaft; and a nut member engaging the sleeve and body member respectively by threads of opposite pitch, to effect a rapid clamping action.

2. A cutting tool combining a supporting shaft; a cutter body adjustable thereon; and means for securing the cutter body in adjusted positions comprising a wedging element between said body and shaft; and a ring engaging said wedging element and body member respectively by threads of opposite pitch whereby rotation of said ring effects a compound movement of said wedging member and cutter body relative to each other.

3. In a boring head, the combination comprising a body member, having cutting members mounted thereon; a sleeve member mounted in said body member and adapted to fit a supporting shaft; a key member for preventing relative rotation between the body member, the sleeve and the supporting shaft; and a clamping ring located in a recess between the body member and the sleeve, said ring being joined to the sleeve by threads of one hand and to the body member by threads of an opposite hand.

4. In a boring head, the combination comprising a body member; a removable blade-holding member secured to the body member; a plurality of cutting blades detachably secured to said holding member; a tapered sleeve mounted within said body member and said holding member; a key member for preventing relative rotation of the body member and the holding member with respect to the tapered sleeve; and a clamping ring located in a recess formed between the sleeve and the body member, said ring being connected to the sleeve and the body member by threads of opposite hand so as to effect a quick clamping of the tool to a supporting shaft.

5. In a boring head, the combination comprising a body member; a plurality of cutting members mounted on said body member; a tapered sleeve adapted to fit a supporting shaft and mounted in said body member to form an annular recess between it and the body member at one end of the tool, said sleeve and said body member respectively having threads of opposite hand formed on them in said recess; and a clamping ring located in said recess and having threads of opposite hand to engage said threads on the sleeve and on the body member.

6. In a boring head, the combination comprising a body member; a tapered sleeve mounted in said body member and forming a recess between it and the body member at one end of the head; and a ring member mounted in said recess between the body member and the sleeve, said ring member being joined to the sleeve and the body member by threads of opposite hand to provide quick relative movement between the sleeve and the body member upon movement of the ring for clamping and unclamping purposes.

7. In a boring head, the combination comprising a body member; a plurality of detachable cutting members so mounted on said body member as to provide for radial adjustment of them with respect to the axis of the head; a tapered sleeve mounted in said body member and fitted to a suporting shaft; and a clamping ring located in a recess between the sleeve and the body member, said ring being so connected to the sleeve and to the body member as to effect relative movement between the sleeve and the body member for clamping the head to the supporting shaft when rotated in one direction and when rotated in an opposite direction for effecting relative movement between the sleeve and the body member for unclamping the head from the supporting shaft.

8. In a boring head, the combination comprising a body member; a blade holding member secured to the body member, the inside surface of said body member and said holding member being in the form of a truncated cone; a plurality of cutting blades detachably secured to said holding member; a tapered sleeve fitted to the truncated cone surface on the body member and the holding member, said sleeve being adapted to engage a supporting shaft and forming a recess between it and the body member at one end of the tool; and a clamping ring mounted in said recess between the sleeve and the body member, said ring having internal threads of one hand and external threads of an opposite hand formed thereon to engage similar threads formed on body member and the sleeve.

9. In a boring head, the combination comprising a body member; a blade holding member secured to said body member; a plurality of cutting blades inserted in slots formed in said holding member, each of said blades having a number of corrugations parallel to one of its cutting edges and said slots having interfitting corrugations progressively offset whereby upon shifting each of said blades to the slot next advanced it will protrude to a slightly greater extent; a tapered sleeve member mounted in said holding member and the body member and adapted to fit a supporting shaft; and a ring located in a recess between the sleeve member and said body member, said ring being connected to the body member and the sleeve member by threads of opposite hand to effect relative movement between such member for clamping purposes.

10. In a boring head adjustably mounted on a supporting shaft, the combination comprising a body member; a tool holding member removably mounted on the body member; cutting blades detachably mounted in said holding member; a tapered sleeve mounted in said body member and adapted to fit the supporting shaft; and a clamping member threadably connected to the body member and to the sleeve by threads of different character to effect a quick clamping or unclamping of the body member to the shaft upon turning the clamping member.

11. In a boring head adjustably mounted on a supporting shaft, the combination comprising a body member; a tool holding member removably mounted on the body member; a split tapered sleeve mounted in said body member and adapted to fit the supporting shaft; and a clamping member threadably connected to the body member and threadably connected to the sleeve by a different thread so as to effect a rapid clamping or unclamping action upon turning thereof.

12. In a boring head adjustably mounted on a supporting shaft, the combination comprising a body member; a tool holding member removably mounted on the body member; a split tapered sleeve mounted in said body member and adapted to fit the supporting shaft; means for preventing relative rotation between the body member, the sleeve and the shaft; and a clamping member threadably connected to the body member and threadably connected to the sleeve by a different thread so as to effect a rapid clamping or unclamping action upon turning thereof.

In witness whereof, I have hereunto subscribed my name.

OLE SEVERSON.